(12) United States Patent
Furukawa et al.

(10) Patent No.: US 11,211,183 B2
(45) Date of Patent: Dec. 28, 2021

(54) INSULATED ELECTRIC WIRE AND WIRE HARNESS

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Toyoki Furukawa, Mie (JP); Kenichiro Araki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 31 days.

(21) Appl. No.: 16/623,826

(22) PCT Filed: Mar. 23, 2018

(86) PCT No.: PCT/JP2018/011647
§ 371 (c)(1),
(2) Date: Dec. 18, 2019

(87) PCT Pub. No.: WO2018/235369
PCT Pub. Date: Dec. 27, 2018

(65) Prior Publication Data
US 2021/0142927 A1    May 13, 2021

(30) Foreign Application Priority Data
Jun. 19, 2017  (JP) .............................. JP2017-119852

(51) Int. Cl.
*H01B 7/04*     (2006.01)
*C09D 167/02*   (2006.01)
(Continued)

(52) U.S. Cl.
CPC ............. *H01B 7/04* (2013.01); *C09D 167/02* (2013.01); *H01B 3/421* (2013.01); *H01B 7/0009* (2013.01)

(58) Field of Classification Search
CPC ........ H01B 7/04; H01B 3/421; H01B 7/0009; H01B 7/08
(Continued)

(56) References Cited

U.S. PATENT DOCUMENTS

| | | | | |
|---|---|---|---|---|
| 4,734,545 | A | * | 3/1988 | Susuki ................ B60R 16/0215 174/110 SR |
| 2012/0205136 | A1 | * | 8/2012 | Moriuchi ................. C08K 5/49 174/110 SR |
| 2016/0130440 | A1 | * | 5/2016 | Furukawa ............. C08L 67/025 525/444 |

FOREIGN PATENT DOCUMENTS

| | | | | |
|---|---|---|---|---|
| CN | 104945705 B | * | 5/2015 | ............. C08L 23/06 |
| JP | 53-045482 U | * | 4/1978 | ............. C08L 23/06 |

(Continued)

OTHER PUBLICATIONS

International Search Report dated May 15, 2018 for WO 2018/235369 A1.

*Primary Examiner* — William H. Mayo, III
(74) *Attorney, Agent, or Firm* — Abelman, Frayne & Schwab

(57) ABSTRACT

An insulated electric wire includes an insulating coating made of a resin composition, and a wire harness including the insulated electric wire. An insulated electric wire 10 includes an electric wire conductor 12, and an insulating coating 14 that coats the outer circumferential surface of the electric wire conductor 12, wherein the insulating coating 14 is made of a resin composition containing a thermoplastic polyester elastomer as a main component. Furthermore, a wire harness includes the insulated electric wire 10. The
(Continued)

thickness of the insulating coating 14 is preferably less than 0.7 mm.

20 Claims, 2 Drawing Sheets

(51) Int. Cl.
  *H01B 3/42* (2006.01)
  *H01B 7/00* (2006.01)
(58) Field of Classification Search
  USPC .......................... 174/110 R, 110 SC–110 PM
  See application file for complete search history.

(56) References Cited

FOREIGN PATENT DOCUMENTS

| | | |
|---|---|---|
| JP | S53-045482 A | 4/1978 |
| JP | H6-223630 A | 8/1994 |
| JP | 2014-043508 A | 3/2014 |

\* cited by examiner

INSULATED ELECTRIC WIRE AND WIRE HARNESS

CROSS REFERENCE TO RELATED APPLICATIONS

This application is a national phase of PCT application No. PCT/JP2018/011647, filed on 23 Mar. 2018, which claims priority from Japanese patent application No. 2017-119852, filed on 19 Jun. 2017, all of which are incorporated herein by reference.

TECHNICAL FIELD

The present invention relates to an insulated electric wire and a wire harness, and more particularly relates to an insulated electric wire that can be preferably used for electric connection in automobiles and the like, and a wire harness including such an insulated electric wire.

BACKGROUND

In insulated electric wires, high flexibility is often in demand from the viewpoint of ensuring routing. In particular, insulated electric wires used for electric connection in automobiles are more often being arranged in limited spaces or along complex routes following recent increases in functionality and performance of automobiles, and thus demands for flexibility are increasing.

As a means for increasing the flexibility of an insulated electric wire, a method may be employed in which the thickness of an insulating coating is reduced. If the thickness of an insulating coating is reduced, the diameter of an insulated electric wire decreases, which contributes to space saving. However, when the thickness of an insulating coating is reduced, it is difficult to ensure the wear resistance of the insulating coating. When using an insulated electric wire in harsh environments, such as that in an automobile, where it is frequently exposed to vibrations or comes into contact with other members, it is particularly important for the insulating coating to have high wear resistance.

As another means for increasing the flexibility of an insulated electric wire, a method may also be employed in which a composition with high flexibility is selected as a resin composition constituting an insulating coating. However, in many resin materials, if the component compositions are set in order to increase the flexibility, it is often the case that sufficient wear resistance is not ensured.

Conventionally, many insulating coating materials for electric wires for automobiles typically contain polyvinyl chloride (PVC) as a main component, but PVC is not a material with high wear resistance. Thus, for example, in Patent Document 1, attempts were made to obtain both wear resistance and flexibility of an insulating coating, by adding a predetermined amount of plasticizer to PVC, as a method for improving the wear resistance of a resin composition containing PVC as a main component. However, it is difficult to significantly improve the wear resistance of an insulating coating through adjustment of the content of a plasticizer.

Furthermore, in Patent Document 2, attempts were made to improve the wear resistance and the like, by adding a polyester elastomer or a methyl methacrylate-butadiene-styrene resin to an electric wire coating material composed of plasticizer-containing PVC. However, the effect of improving the wear resistance, obtained through adding these resin components to a PVC resin, is limited, and, even when the wear resistance can be improved, it is difficult to sufficiently ensure the flexibility of an insulating coating and to obtain both flexibility and wear resistance.

PRIOR ART DOCUMENT

Patent Document

Patent Document 1: JP 2014-043508A
Patent Document 2: JP H06-223630A

SUMMARY OF THE INVENTION

Problems to be Solved

As described above, as a method for increasing the flexibility of an insulated electric wire, a thickness reducing method for reducing the thickness of an insulating coating is used. The method for reducing the thickness of an insulating coating is effective from the viewpoint of reducing the diameter of an insulated electric wire, but, when the thickness of the insulating coating is reduced, it is difficult to ensure the wear resistance of the insulating coating. Thus, from the viewpoint of ensuring sufficient wear resistance also when the thickness of the insulating coating is reduced, high wear resistance is in demand as a property of a resin composition constituting an insulating coating.

It is an object of the present invention to provide an insulated electric wire including an insulating coating made of a resin composition with high wear resistance, and a wire harness including such an insulated electric wire.

Means to Solve the Problem

In order to solve the above-described problems, the present invention is directed to an insulated electric wire including: an electric wire conductor; and an insulating coating that coats an outer circumferential surface of the electric wire conductor, wherein the insulating coating is made of a resin composition containing a thermoplastic polyester elastomer as a main component.

It is preferable that a thickness of the insulating coating is less than 0.7 mm. Furthermore, it is preferable that a tensile energy at break of the resin composition is 200 mJ/mm$^3$ or more. It is preferable that a hardness of the thermoplastic polyester elastomer is 60 or less as defined by Shore D hardness. It is preferable that a melting point of the thermoplastic polyester elastomer is 200° C. or less. It is preferable that a conductor cross-sectional area of the electric wire conductor is 3 mm$^2$ or more and 20 mm$^2$ or less.

The present invention is further directed to a wire harness including this sort of insulated electric wire.

Effect of the Invention

In the insulated electric wire according to the present invention, the insulating coating is made of a resin composition containing a thermoplastic polyester elastomer as a main component. Accordingly, the insulating coating has high wear resistance as a material property. As a result, even if the thickness of an insulating coating is reduced in order to improve the flexibility of an insulated electric wire and to reduce the diameter thereof, it is easy to ensure sufficient wear resistance of the insulating coating. A thermoplastic polyester elastomer is a material that is excellent in terms of flexibility, which also contributes to obtaining both wear resistance and flexibility of an insulating coating.

If the thickness of the insulating coating is less than 0.7 mm, the insulated electric wire has high flexibility because the insulating coating is thin. Furthermore, it is easy to reduce the diameter of the insulated electric wire. Even when the thickness of an insulating coating is reduced in this manner, it is easy to obtain both sufficient wear resistance and sufficient flexibility due to the effect of a thermoplastic polyester elastomer being contained as a main component in the resin composition constituting an insulating coating.

Furthermore, since the magnitude of the tensile energy at break is a good indicator of the wear resistance of the resin composition, the tensile energy at break of the resin composition being 200 mJ/mm$^3$ or more indicates that the insulating coating is likely to have high wear resistance.

If the hardness of the thermoplastic polyester elastomer is 60 or less as defined by Shore D hardness, it is particularly easy to improve the wear resistance of the insulating coating. Furthermore, it is also easy to improve the flexibility of the insulating coating.

If the melting point of the thermoplastic polyester elastomer is 200° C. or less, the thermoplastic polyester elastomer is likely to provide particularly high wear resistance.

If the conductor cross-sectional area of the electric wire conductor is 3 mm$^2$ or more and 20 mm$^2$ or less, when the thickness of the insulating coating is reduced utilizing high wear resistance of the resin composition, the decrease in the thickness leads to both an increase in the effect of reducing the diameter of an insulated electric wire and an increase in the effect of improving the flexibility.

The wire harness according to the above-described present invention includes this sort of insulated electric wire, and thus it is easy to ensure wear resistance of the insulating coating even when the thickness of the insulating coating of the insulated electric wire is reduced. If the flexibility of the insulated electric wire is improved and the diameter is reduced by reducing the thickness of the insulating coating, an improvement in the flexibility of the wire harness as a whole and space saving can be realized.

BRIEF DESCRIPTION OF THE DRAWINGS

FIG. 1A is a perspective view thereof, and FIG. 1B is a circumferential cross-sectional view.

DETAILED DESCRIPTION TO EXECUTE THE INVENTION

Hereinafter, an insulated electric wire and a wire harness according to an embodiment of the present invention will be described in detail with reference to the drawings.

[Outline of Insulated Electric Wire]

First, the outline of an insulated electric wire according to an embodiment of the present invention will be described. Note that, in this specification, physical properties of materials refer to values as measured at room temperature in air, unless otherwise described.

Figure 1A:
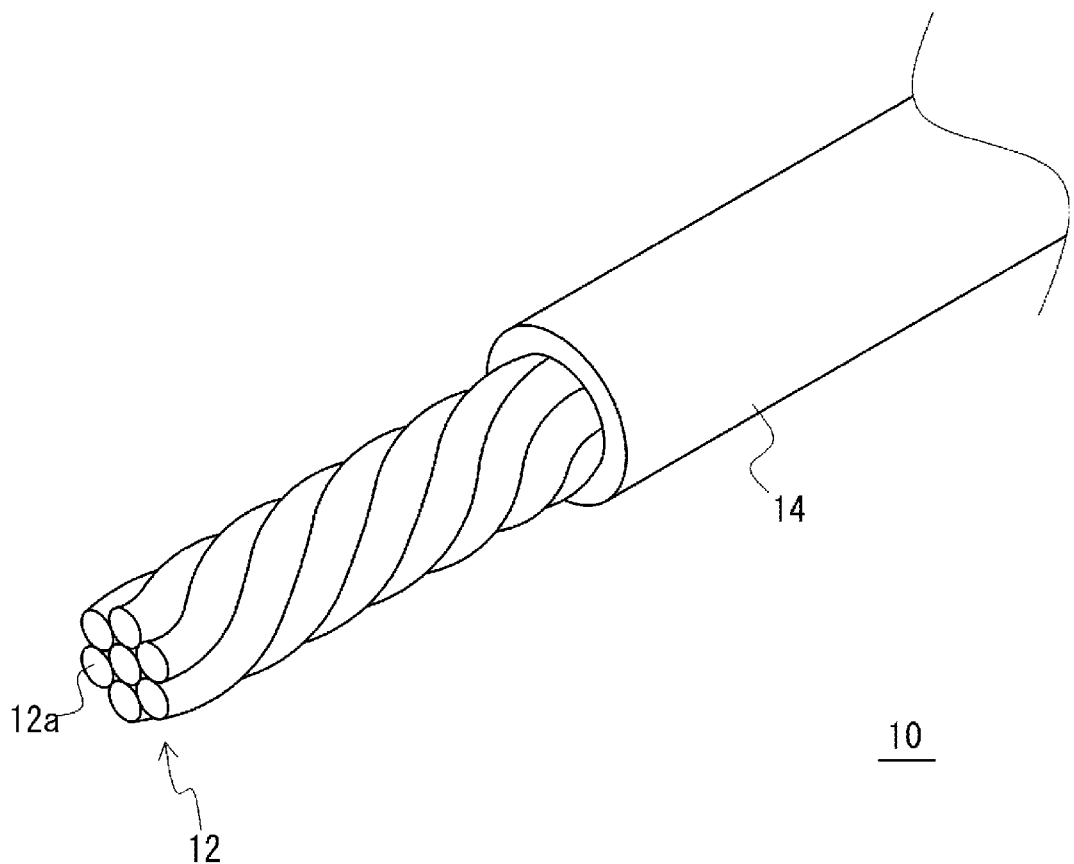
FIGS. 1A and 1B show an insulated electric wire according to an embodiment of the present invention, where
Figure 1B:
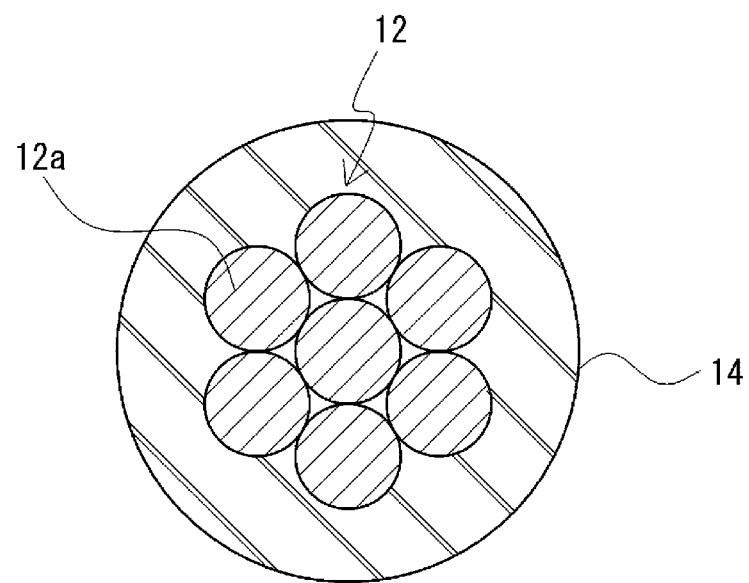

FIG. 1 shows the outline of an insulated electric wire according to an embodiment of the present invention. As shown in FIG. 1, an insulated electric wire 10 includes an electric wire conductor 12, and an insulating coating 14 that coats the outer circumferential surface of the electric wire conductor 12. The insulated electric wire 10 can be obtained through extrusion to coat the outer circumferential surface of the electric wire conductor 12 with a resin composition for forming the insulating coating 14.

As will be described later in detail, the insulating coating 14 is made of a resin composition containing a thermoplastic polyester elastomer as a main component. The insulating coating 14 has high wear resistance because it is made of such a resin composition. Since the insulating coating 14 is made of a resin composition with high wear resistance, even when the thickness of the insulating coating 14 is reduced in order to improve the flexibility of an insulated electric wire 10 and to reduce the diameter thereof, for example, the wear resistance of the insulating coating 14 can be ensured.

The thickness of the insulating coating 14 is preferably less than 0.7 mm. Accordingly, in the insulated electric wire 10, it is easy to improve the flexibility and to reduce the diameter. The thickness of the insulating coating 14 is more preferably 0.5 mm or less. Meanwhile, from the viewpoint of making it easy to ensure mechanical properties such as wear resistance of the insulating coating 14, the thickness of the insulating coating 14 is preferably 0.3 mm or more. If the thickness of the insulating coating 14 is uneven, it is sufficient that the average thickness is within the above-described range.

The electric wire conductor 12 is typically made of copper, but may be also made of metal materials other than copper, such as aluminum or magnesium. These metal materials may be alloys. Examples of other metal materials for forming alloys include iron, nickel, magnesium, silicon, and combinations thereof.

Of these materials, aluminum and an aluminum alloy have lower electrical conductivity than that of copper and a copper alloy, of which electric wire conductors are typically made. Thus, if aluminum or an aluminum alloy is used for the electric wire conductor 12, the outer diameter of the electric wire conductor 12 is likely to increase in order to ensure necessary conductivity. Thus, the meaning of reducing the diameter of the entire insulated electric wire 10 by reducing the thickness of the insulating coating 14 by using a material with high wear resistance is particularly significant.

The electric wire conductor 12 may be composed of a solid wire, or a twisted wire formed by twisting together a plurality of element wires 12a. From the viewpoint of ensuring the flexibility of the insulated electric wire 10, the electric wire conductor 12 is preferably composed of a twisted wire. In this case, if the outer diameter of each element wire 12a constituting a twisted wire is 0.45 mm or less, it is particularly easy to ensure the flexibility of the twisted wire as a whole.

There is no particular limitation on the conductor cross-sectional area of the electric wire conductor 12, but it is preferably 3 mm$^2$ or more. If the conductor cross-sectional area is less than 3 mm$^2$, even when the thickness of the insulating coating 14 is reduced, relatively, the diameter of the entire insulated electric wire 10 cannot be effectively reduced. On the other hand, if the conductor cross-sectional area is 3 mm$^2$ or more, the diameter can be effectively reduced by reducing the thickness of the insulating coating 14. An insulated electric wire in which the conductor cross-sectional area of the electric wire conductor 12 is 3 mm$^2$ or more is generally referred to as a thick electric wire, and, when forming an insulating coating using a conventionally available PVC resin, the thickness of the insulating coating is typically 0.8 mm or more in order to ensure wear resistance. However, as described above, if the thickness of the insulating coating 14 is suppressed to less than 0.7 mm using a resin composition with high wear resistance, the diameter of a thick insulated electric wire using such a conventionally available PVC resin coating can be reliably reduced. More preferably, the conductor cross-sectional area of the electric wire conductor 12 is 8 mm$^2$ or more.

Meanwhile, the conductor cross-sectional area of the electric wire conductor 12 is preferably 20 mm$^2$ or less. If the conductor cross-sectional area is more than 20 mm$^2$, the flexibility of the electric wire conductor 12 is too low, and even when the flexibility of the insulating coating 14 is increased by reducing the thickness, it is difficult to ensure sufficient flexibility of the insulated electric wire 10 as a whole. On the other hand, if the conductor cross-sectional area is 20 mm$^2$ or less, it is possible to effectively improve the flexibility of the insulated electric wire 10 by reducing the thickness of the insulating coating 14. More preferably, the conductor cross-sectional area of the electric wire conductor 12 is 16 mm$^2$ or less. Any combination may be selected as the thickness of the insulating coating 14 and the conductor cross-sectional area of the electric wire conductor 12, and the more the thickness of the insulating coating 14 is reduced and the more the conductor cross-sectional area of the electric wire conductor 12 is reduced, the more the flexibility of the insulated electric wire 10 can be increased. However, from the viewpoint of enabling both the small thickness of the insulating coating 14 and the small conductor cross-sectional area to effectively contribute to an improvement in the flexibility of the insulated electric wire 10 as a whole, if the conductor cross-sectional area is 8 mm$^2$ or less, such as 3 mm$^2$, the thickness of the insulating coating 14 is preferably 0.4 mm or less. Meanwhile, if the conductor cross-sectional area is more than 8 mm$^2$, such as 20 mm$^2$, the thickness of the insulating coating 14 is preferably less than 0.7 mm.

There is no particular limitation on the applications of the insulated electric wire 10 according to this embodiment, but it can be used as various electric wires for automobiles, devices, information communications, electric powers, watercrafts, aircrafts, and the like. In particular, usage as an electric wire for automobiles is preferable. For an electric wire for automobiles, a certain level of freedom in routing is necessary from the viewpoint of space saving and the like, and high flexibility is in demand. Similarly, from the viewpoint of space saving, a reduction in the diameter of the electric wire is also in demand. In particular, in the case of an electric wire with a large conductor cross-sectional area, there is intense demand for flexibility. Furthermore, an electric wire for automobiles is likely to come into contact with a vehicle main body or another component during assembly and likely to undergo friction with a vehicle main body or another component during use, and thus excellent wear resistance is necessary. In the insulated electric wire 10 according to this embodiment, the insulating coating 14 is made of a resin composition with high wear resistance, and thus it is possible to obtain both flexibility and wear resistance by reducing the thickness of the insulating coating 14 while maintaining sufficient wear resistance, and to reduce the diameter of the insulated electric wire 10.

The insulated electric wire 10 according to this embodiment may be used either in the form of a solid wire, or a wire harness including a plurality of such insulated electric wires. All insulated electric wires constituting a wire harness may be the insulated electric wires 10 according to this embodiment, or only some of them may be the insulated electric wires 10 according to this embodiment. In the insulated electric wire 10 according to this embodiment, the insulated electric wire 10 is made flexible and its diameter is reduced by reducing the thickness of the insulating coating 14 while maintaining wear resistance, which contributes to an improvement in the flexibility of a wire harness including the insulated electric wire 10 as a whole and space saving.

[Resin Composition Constituting Insulating Coating]

Next, a resin composition constituting the insulating coating 14 of the insulated electric wire 10 according to this embodiment will be described in detail.

As described above, the resin composition constituting the insulating coating 14 contains a thermoplastic polyester elastomer as a main component. "Containing a thermoplastic polyester elastomer as a main component" means a state in which, among polymer components constituting the resin composition, the content of thermoplastic polyester elastomer is the largest. The amount of thermoplastic polyester elastomer contained in the polymer components is preferably 50% by mass or more, and more preferably 80% by mass or more. It is particularly preferable that the polymer components are composed of only the thermoplastic polyester elastomer.

The thermoplastic polyester elastomer has a hard segment and a soft segment in the molecule structure, wherein the hard segment is composed of a polyester unit. There is no particular limitation on the type of soft segment, and examples thereof include those with a polyether-based structure and a polyester-based structure. The thermoplastic polyester elastomers contained in the resin composition may be used alone or in combination of two or more.

The thermoplastic polyester elastomer is a material with excellent wear resistance. If the resin composition constituting the insulating coating 14 contains a thermoplastic polyester elastomer as a main component, the resin composition has high wear resistance as a material property. As a result, as described above, even if the thickness of the insulating coating 14 is reduced from the viewpoint of improving the flexibility of the insulated electric wire 10 and reducing the diameter thereof, high wear resistance of the insulating coating 14 can be ensured. Furthermore, the thermoplastic polyester elastomer is excellent in terms of not only wear resistance but also flexibility, and thus the effect of the material properties, together with the effect of reducing the thickness of the insulating coating 14, contributes to an improvement in the flexibility of the insulated electric wire 10.

Furthermore, the hardness of the thermoplastic polyester elastomer is preferably 60 or less as defined by Shore D hardness. If the thermoplastic polyester elastomer has such hardness, the insulating coating 14 has particularly excellent wear resistance. The reason for this seems to be that, if the hardness of the thermoplastic polyester elastomer is as low as 60 or less as defined by Shore D hardness, the material properties of the thermoplastic polyester elastomer make a great contribution to abrasion of the insulating coating 14. Furthermore, since the hardness of the thermoplastic polyester elastomer is kept low, it is also easy to improve the flexibility as a material property of the resin composition. More preferably, the hardness of the thermoplastic polyester elastomer is 40 or less as defined by Shore D hardness. Not only the thermoplastic polyester elastomer alone but also the resin composition constituting the insulating coating 14 as a whole has a hardness of preferably 60 or less, and more preferably 40 or less, as defined by Shore D hardness.

Furthermore, from the viewpoint of ensuring high wear resistance, the melting point of the thermoplastic polyester elastomer is preferably 200° C. or less. The reason for this seems to be that, the lower the melting point is, the weaker the interaction between molecules is and the more energy that is absorbed increases. More preferably, the melting point is 190° C. or less.

The resin composition constituting the insulating coating 14 may contain components other than the thermoplastic polyester elastomer as appropriate, as long as the wear resistance of the thermoplastic polyester elastomer is not significantly impaired. Examples of components other than the thermoplastic polyester elastomer include other polymer components and additives.

There is no particular limitation on other polymer components that may be contained in the resin composition, but examples of polymer components that are expected to improve the wear resistance effect include the following components. In all cases, the content is preferably 5 parts by mass or less with respect to 100 parts by mass of the thermoplastic polyester elastomer.

Other thermoplastic elastomers: in particular, styrene-based thermoplastic elastomers such as maleic acid modified styrene-ethylene-butylene-styrene block copolymer (SEBS) and amine modified SEBS Oxazoline modified polystyrenes (PS)

Also, there is no particular limitation on additives that may be contained in the resin composition, and additives that are typically contained in resin compositions for coating electric wires, such as antioxidants and flame retardants, may be contained as appropriate. Of these, examples of additives that are expected to improve the wear resistance effect include the following additives.

Carbodiimide group containing compound (preferably in an amount of 5 parts by mass or less with respect to 100 parts by mass of the thermoplastic polyester elastomer)

Inorganic fillers such as calcium carbonate, talc, clay, and silica

Note that a plasticizer may be added to the resin composition. However, if a plasticizer is added, the wear resistance of the thermoplastic polyester elastomer is likely to be significantly lowered although the flexibility thereof is improved to some extent, and thus, from the viewpoint of maintaining the wear resistance, it is preferable not to add a plasticizer.

The resin composition constituting the insulating coating 14 preferably has a tensile energy at break of 150 mJ/mm$^3$ or more. As described later, the tensile energy at break of the resin composition is a good indicator for evaluating the wear resistance, and thus, if the resin composition has a tensile energy at break of 200 mJ/mm$^3$ or more, it is easy to ensure a high wear resistance even when the thickness of the insulating coating 14 is reduced. The tensile energy at break of the resin composition is 200 mJ/mm$^3$ or more, preferably 400 mJ/mm$^3$ or more, and more preferably 500 mJ/mm$^3$ or more. Furthermore, not only the resin composition as a whole but also the thermoplastic polyester elastomer alone, contained in the resin composition as a main component, has a tensile energy at break of preferably 150 mJ/mm$^3$ or more, more preferably 200 mJ/mm$^3$ or more, even more preferably 400 mJ/mm$^3$ or more, and even more preferably 500 mJ/mm$^3$ or more.

[Evaluation of Wear Resistance Based on Tensile Energy at Break]

Tensile energy at break of the resin composition has a high correlation with wear resistance, and a resin composition with large tensile energy at break can be regarded as having high wear resistance.

Directly, tensile energy at break is the magnitude of energy that is applied to a material when the material is subjected to tension until it breaks. The tensile energy at break of the resin composition can be evaluated, for example, through tensile testing as defined by JIS K 7161. A sample made of the resin composition is held at two points along the length direction thereof by chucks, and a tensile load is applied to the sample between the chucks. At this time, the relationship between load applied per unit area (stress, unit: MPa) and elongation (strain, unit: dimensionless) until the sample breaks is recorded. Then, as shown as an example in FIG. 2, an SS curve (stress-strain curve) is plotted taking the load applied per unit area as the vertical axis and taking the elongation as the horizontal axis. Then, the area below the SS curve until the sample breaks (the area of the region defined by the SS curve, the horizontal axis, and a vertical line that passes through the break point) is calculated, and the thus obtained value is taken as the tensile energy at break of the resin material (unit: mJ/mm$^3$).

The sample used for the tensile testing may be obtained, for example, by taking out the electric wire conductor 12 from the insulated electric wire 10 with a length of approximately 100 mm. Furthermore, the test conditions may be, for example, as follows: the distance between the chucks is 20 mm, and the tensile speed is 200 mm/min. The tensile energy at break such as 150 mJ/mm$^3$ or more described above as a preferable value for the resin composition containing the thermoplastic polyester elastomer as a main component can also be measured under these conditions.

Tensile energy at break directly indicates the strength of a material against tension, and is not generally used as an indicator of wear resistance. However, as shown in Examples below, there is a positive correlation between tensile energy at break and wear resistance, and the tensile energy at break can be used as an indicator of the wear resistance. The reason for this seems to be that the tensile energy at break has a correlation with energy that is consumed when scraping off the resin material on the surface of the insulated electric wire 10.

Wear resistance can also be directly evaluated through abrasion testing that observes the level of abrasion when stimulation such as friction is applied to an actual sample. However, instead of, or in addition to the abrasion testing, tensile energy at break may be measured through tensile testing and used as an indicator of the wear resistance, thereby enabling the wear resistance of the resin material to be evaluated and estimated in a simpler and more accurate manner. Note that a value of elongation at break (tensile elongation at break), a value of an applied load (tensile strength at break), and tensile elastic modulus (a slope at a rising portion of the SS curve), which are parameters obtained through tensile testing, do not have a correlation with wear resistance as in the case of tensile energy at break, and thus it is difficult to use these parameters as indicators for evaluating the wear resistance.

There is no limitation on the resin composition containing a thermoplastic polyester elastomer as a main component as described above, and it is possible to find a resin composition with high wear resistance that can be used as the insulating coating 14 of the insulated electric wire 10, using a correlation between tensile energy at break and wear resistance. That is to say, when an attempt is made to obtain the insulating coating 14 made of a material with high wear resistance in order to reduce the thickness of the insulating coating 14 of the insulated electric wire 10, for example, it is sufficient to set a threshold of tensile energy at break at which required wear resistance is realized, and use a resin composition with tensile energy at break that is greater than or equal to the threshold. As shown in Examples below, a relationship between tensile energy at break and wear resistance can be approximated to a single correlation function (a straight or curved line) beyond the type of resin composition (the type of polymer material contained as a main component), and thus use of a resin composition with tensile energy at break that is greater than or equal to a predetermined threshold makes it possible to obtain an insulating coating 14 with the desired high wear resistance, regardless of the details of component composition of the resin composition.

A specific threshold of tensile energy at break may be selected as appropriate according to the level of required wear resistance. For example, it is envisioned that there will be a demand to reduce the thickness of the insulating coating 14 while keeping the wear resistance of the insulating coating 14 as a whole similar to that of an insulating coating made of a conventionally available PVC resin, in order to improve the flexibility of the insulated electric wire 10 and to reduce the diameter thereof. The wear resistance of the insulating coating 14 as a whole increases in accordance with an increase in the thickness of the insulating coating 14, and thus, in order to realize an insulating coating 14 with a thickness smaller than that of a conventional insulating coating together with wear resistance similar to that of the conventional insulating coating, it is sufficient to make tensile energy at break indicating wear resistance as a material property (a property of a material itself irrelevant to the thickness) higher than that of the conventional insulating coating.

EXAMPLES

Hereinafter, examples of the present invention will be described. Note that the present invention is not limited to these examples.

[Test A: Properties of Insulating Coating Containing Thermoplastic Polyester Elastomer as Main Component]

[Test Method]

(1) Preparation of Sample

Aluminum twisted wire conductors respectively having a conductor cross-sectional area of 3 mm$^2$ (the element wire diameter 0.32 mm, the number of element wires 37) and a conductor cross-sectional area of 20 mm$^2$ (the element wire diameter 0.32 mm, the number of element wires 19/13) were prepared. Resin compositions made of components shown in Tables 1 and 2 were extrusion-molded to a predetermined thickness around each of the outer circumferential surfaces of the twisted wire conductors, so that insulated electric wires were prepared.

The materials used in the examples and comparative examples are as follows. In the examples, the thermoplastic polyester elastomers were used as is as resin compositions, whereas, in the comparative examples, the components were mixed through kneading to obtain the resin compositions as shown in Table 2. Table 2 shows the contents of the components in units of parts by mass.

(Thermoplastic Polyester Elastomer)

TPEE1 (Shore D hardness 27; melting point 160° C.): "Hytrel 3046" manufactured by Du Pont-Toray Co., Ltd.

TPEE2 (Shore D hardness 47; melting point 200° C.): "Hytrel 4777" manufactured by Du Pont-Toray Co., Ltd.

TPEE3 (Shore D hardness 53; melting point 208° C.): "Hytrel 5577" manufactured by Du Pont-Toray Co., Ltd.

TPEE4 (Shore D hardness 72; melting point 219° C.): "Hytrel 7277" manufactured by Du Pont-Toray Co., Ltd.

(Other Materials)

Polyvinyl chloride (PVC): "ZEST1300Z" (degree of polymerization 1300) manufactured by Shindai-Ichi Vinyl Corporation Plasticizer: "Monocizer W-700" (trimellitic acid ester) manufactured by DIC Non lead-based thermal stabilizer: "RUO-110" (Ca—Zn-based) manufactured by ADEKA Corporation Extender: "Super 1700" (calcium carbonate) manufactured by Maruo Calcium Co., Ltd.

(2) Evaluation of Tensile Energy at Break

Each of the insulated electric wires according to the examples and comparative examples was cut to a length of 100 mm, and an electric wire conductor thereof was removed, so that only an insulating coating was obtained. The insulating coating was used as a sample, and its tensile energy at break was estimated through tensile testing. That is to say, the sample was held at two points along the length direction thereof by chucks, and subjected to tensile testing at a distance of 20 mm between the chucks and a tensile speed of 200 mm/min. Then, an SS curve was plotted, and the area below the SS curve until the sample broke was calculated as the tensile energy at break. The tensile energy at break is susceptible to errors due to factors such as variations in manufacture conditions of insulated electric wires, and it was confirmed that there may be errors by approximately 20% in similar samples that were separately manufactured.

(3) Evaluation of Wear Resistance

Evaluation of wear resistance was performed through tape abrasion testing as defined by ISO6722. That is to say, a tape-like piece of sandpaper was pressed at a load of 1500 g against each of the outer circumferential surfaces of the insulated electric wires according to the examples and comparative examples, and the distance by which the tape was moved until the electric wire conductor was exposed was measured. A larger movement distance indicates superior wear resistance. The samples with a conductor cross-sectional area of 3 mm$^2$ were evaluated such that a movement distance of 600 mm or more indicates excellent wear resistance "A", a movement distance of 200 mm or more and less than 600 mm indicates good wear resistance "B", and a movement distance of less than 200 mm indicates unsatisfactory wear resistance "C". Furthermore, the samples with a conductor cross-sectional area of 20 mm$^2$ were evaluated such that a movement distance of 2000 mm or more indicates excellent wear resistance "A", a movement distance of 1000 mm or more and less than 2000 mm indicates good wear resistance "B", and a movement distance of less than 1000 mm indicates unsatisfactory wear resistance "C".

(4) Evaluation of Flexibility

As described below, the flexibility of the insulated electric wires according to the examples and comparative examples was evaluated. First, each of the insulated electric wires cut to a length of 400 mm was fixed at a bending radius of 90 mm at positions thereof that were 75 mm away from the respective two ends. The insulated electric wire was vertically bent at a speed of 50 mm/min at the middle between these fixing positions. At this time, the samples with a conductor cross-sectional area of 3 mm$^2$ were bent at a bending radius of 22.5 mm, and the samples with a conductor cross-sectional area of 20 mm$^2$ were bent at a bending radius of 45 mm. The repulsive force when the samples were bent was measured by a load cell. A smaller repulsive force indicates higher flexibility. The samples with a conductor cross-sectional area of 3 mm² were evaluated such that a repulsive force of less than 2 N indicates high flexibility "A", and a repulsive force of 2 N or more indicates low flexibility "B". The samples with a conductor cross-sectional area of 20 mm² were evaluated such that a repulsive force of less than 10 N indicates high flexibility "A", and a repulsive force of 10 N or more indicates low flexibility "B".

[Results]

Tables 1 and 2 show evaluation results of the examples and comparative examples in terms of tensile energy at break, wear resistance, and flexibility, together with the configurations of their insulated electric wires.

TABLE 1

| | | | | Examples | | | | |
|---|---|---|---|---|---|---|---|---|
| | A1 | A2 | A3 | A4 | A5 | A6 | A7 | A8 |
| Thermoplastic polyester elastomer | TPEE1 | TPEE2 | TPEE3 | TPEE4 | TPEE1 | TPEE4 | TPEE1 | TPEE4 |
| Conductor cross-sectional area (mm²) | 3 | 3 | 3 | 3 | 20 | 20 | 3 | 20 |
| Coating thickness (mm) | 0.4 | 0.4 | 0.4 | 0.4 | 0.65 | 0.65 | 0.75 | 1.1 |
| Tensile energy at break (mJ/mm³) | 492 | 533 | 175 | 218 | 476 | 214 | 501 | 236 |
| Tensile elastic modulus (MPa) | 19 | 59 | 115 | 200 | 19 | 200 | 19 | 200 |
| Wear resistance Measured value (mm) | 650 | 800 | 250 | 500 | 2400 | 1500 | 1650 | 4200 |
| Wear resistance Evaluation | A | A | B | B | A | B | A | A |
| Flexibility Measured value (N) | 1.2 | 1.1 | 1.4 | 1.4 | 4.2 | 7.3 | 4.2 | 24 |
| Flexibility Evaluation | A | A | A | A | A | A | B | B |

TABLE 2

| | Comparative Examples | | | |
|---|---|---|---|---|
| | A1 | A2 | A3 | A4 |
| Polyvinyl chloride | 100 | 100 | 100 | 100 |
| Plasticizer | 40 | 60 | 40 | 60 |
| Non lead-based thermal stabilizer | 5 | 5 | 5 | 5 |
| Extender (calcium carbonate) | 10 | 10 | 10 | 10 |
| Conductor cross-sectional area (mm²) | 3 | 3 | 20 | 20 |
| Coating thickness (mm) | 0.4 | 0.4 | 0.65 | 0.65 |
| Tensile energy at break (mJ/mm³) | 28 | 48 | 32 | 46 |
| Tensile elastic modulus (MPa) | 180 | 30 | 180 | 30 |
| Wear resistance Measured value (mm) | 100 | 50 | 750 | 450 |
| Wear resistance Evaluation | C | C | C | C |
| Flexibility Measured value (N) | 7.3 | 1.2 | 14.2 | 4.2 |
| Flexibility Evaluation | B | A | B | A |

First, in all of Comparative Examples A1 to A4 of Table 2, the polymer component of the insulating coating is made of polyvinyl chloride, and thus the wear resistance is insufficient. The tensile energy at break that is as low as 50 mJ/mm³ or less corresponds to low wear resistance. In Comparative Examples A2 and A4 in which the content of a plasticizer is high, the flexibility is high to some extent, whereas, in Comparative Examples A1 and A3 in which the content of plasticizer is low, not only the wear resistance but also the flexibility is low.

On the other hand, in all of Examples A1 to A8 of Table 1, the insulating coating is made of the thermoplastic polyester elastomer, and thus the wear resistance is good. The high wear resistance corresponds to tensile energy at break larger than that of the comparative examples. Furthermore, a comparison between Examples A1 to A4 in which the insulating coatings have the same thickness shows that larger tensile energy at break corresponds to higher wear resistance. Out of these examples, in Examples A1 and A2 in which the melting point of the thermoplastic polyester elastomer is 200° C. or less, particularly high wear resistance is realized. The tensile elastic modulus does not have any clear correlation with wear resistance.

The flexibility of an insulated electric wire depends on the thickness of the insulating coating. In Examples A1 to A6 in which the thickness of the insulating coating is less than 0.7 mm, the high flexibility is high. The flexibility of an insulated electric wire is not largely dependent on the conductor cross-sectional area.

[Test B: Relationship between Tensile Energy at Break and Wear Resistance of Insulating Coating]

[Test Method]

(1) Preparation of Sample

Insulated electric wires were prepared as in the test A above. In this test, the conductor cross-sectional area was set to 3 mm², and the thickness of the insulating coating was set to 0.7 mm.

The insulating coatings of the samples are respectively made of the resin materials shown in Table 3. The polyvinyl chloride used in the sample B8 is the same resin composition as that in Comparative Examples A2 and A4 of the test A above. Furthermore, the polyester elastomer 1 used in the sample B3 is the same as TPEE2 of the test A, and the polyester elastomer 2 used in the sample B4 is the same as TPEE4 of the test A. The details of the other samples are as follows.

Polyurethane elastomer (ester-based): "Resamine P-1078" manufactured by Dainichiseika Color & Chemicals Mfg. Co., Ltd.

Polyurethane elastomer (ether-based): "Resamine P-2283" manufactured by Dainichiseika Color & Chemicals Mfg. Co., Ltd.

Figure 2:
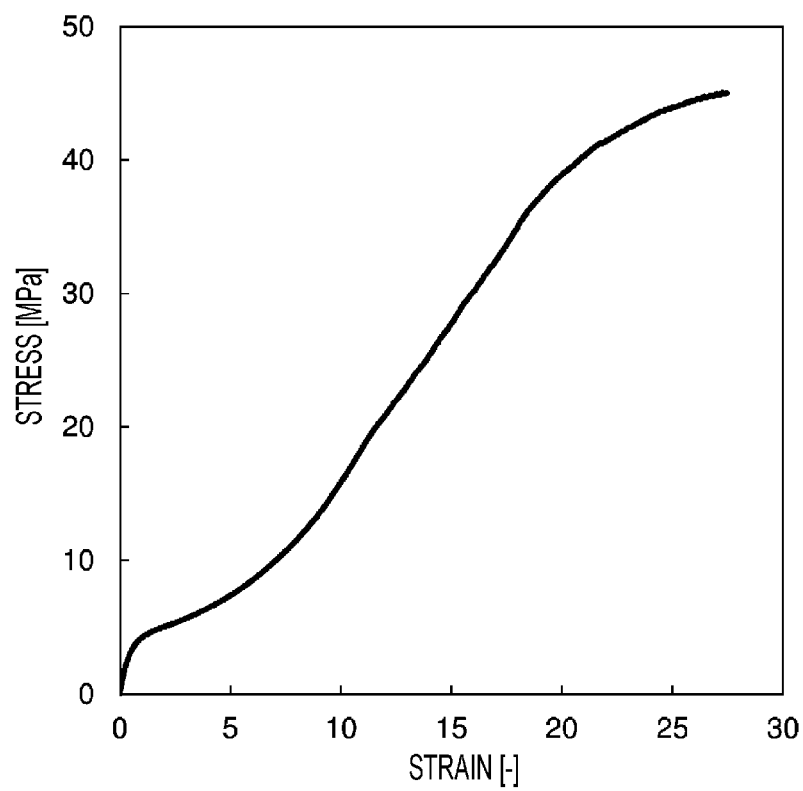
FIG. 2 shows an example of an SS curve when the tensile energy at break is measured, obtained by measuring a sample of Example B3.

Polyolefin elastomer: "Thermorun QT60MB" manufactured by Mitsubishi Chemical Corporation Modified polyphenylene ether (PPE): "Xyron AF700" manufactured by Asahi Kasei Corporation Polyacetal (POM): "Tenac EX352" manufactured by Asahi Kasei Corporation (2) Evaluation of Properties The tensile energy at break of each sample was evaluated by plotting an SS curve as in the test A. Furthermore, the wear resistance was evaluated as in the test A. In the tensile testing for obtaining the tensile energy at break, the tensile elastic modulus was also obtained. FIG. 2 shows, as an example, an SS curve obtained for the sample of Example B3.

[Results]

Table 3 shows evaluation results of the examples in terms of tensile elastic modulus, tensile energy at break, and wear resistance together with the resin types of their insulating coatings. Furthermore, in FIG. 3, a relationship between the tensile energy at break and the wear resistance evaluation result is plotted.

TABLE 3

| Sample | Resin type | Tensile elastic modulus (MPa) | Tensile energy at break (mJ/mm$^3$) | Wear resistance evaluation (mm) |
|---|---|---|---|---|
| B1 | Polyurethane elastomer (ester-based) | 30 | 550 | 2600 |
| B2 | Polyurethane elastomer (ester-based) | 7 | 685 | 3400 |
| B3 | Polyester elastomer 1 | 59 | 526 | 2500 |
| B4 | Polyester elastomer 2 | 200 | 232 | 1750 |
| B5 | Polyolefin elastomer | 3 | 38 | 200 |
| B6 | Modified polyphenylene ether | 2500 | 23 | 300 |
| B7 | Polyacetal | 3000 | 46 | 300 |
| B8 | Polyvinyl chloride | 30 | 47 | 500 |

Figure 3:
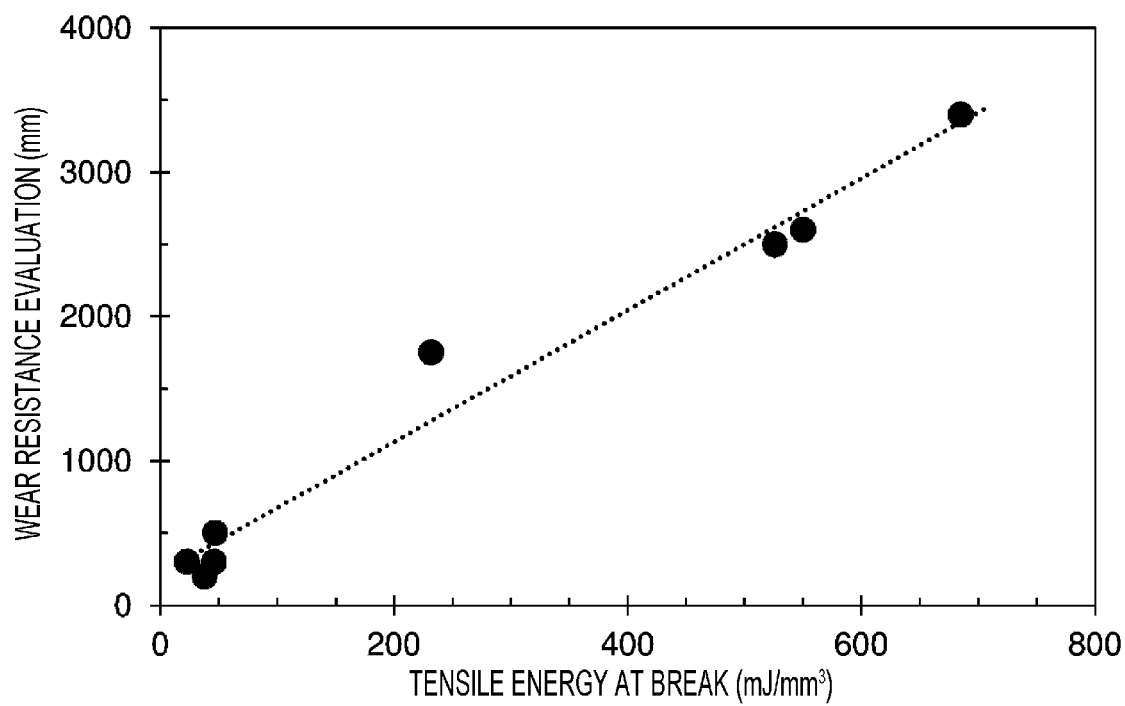
FIG. 3 is a graph showing a relationship between the tensile energy at break and the wear resistance evaluation result of Examples.

It is seen from Table 3 and FIG. 3 that the tensile energy at break and the wear resistance evaluation result have a relationship where the wear resistance increases as the tensile energy at break increases. As indicated by the dotted line in FIG. 3, their relationship can be approximated substantially as a straight line. The resins constituting the samples are of various types, and it can be said that there is such a relationship beyond the resin type. This result shows that tensile energy at break of the resin material is excellent as an indicator of wear resistance.

In particular, in the samples B1 to B4 in which a thermoplastic elastomer was used in the insulating coating, the tensile energy at break was as high as 200 mJ/mm$^3$ or more. Accordingly, the wear resistance evaluation result was as high as over 1500 mm.

Table 3 also shows the tensile elastic modulus of each resin type. It is seen that, contrary to the tensile energy at break, the tensile elastic modulus does not have any clear correlation with wear resistance.

Although an embodiment of the present invention is described in detail above, the present invention is not limited in any way to the foregoing embodiment, and various improvements can be made without departing from the gist of the present invention.

LIST OF REFERENCE NUMERALS

10 Insulated electric wire
12 Electric wire conductor
12*a* Element wire
14 Insulating coating

The invention claimed is:

1. An insulated electric wire including an electric wire conductor, and an insulating coating that coats an outer circumferential surface of the electric wire conductor,
wherein the insulating coating is made of a resin composition containing a thermoplastic polyester elastomer as a main component, and
a tensile energy at break of the resin composition, obtained by measuring only the insulating coating obtained by removing the electric wire conductor from the insulated electric wire, is 200 mJ/mm$^3$ or more.

2. The insulated electric wire according to claim 1, wherein a thickness of the insulating coating is less than 0.7 mm.

3. The insulated electric wire according to claim 2, wherein the thickness of the insulating coating is 0.3 mm or more.

4. The insulated electric wire according to claim 1, wherein the tensile energy at break of the resin composition is 400 mJ/mm$^3$ or more.

5. The insulated electric wire according to claim 1, wherein a hardness of the thermoplastic polyester elastomer is 60 or less as defined by Shore D hardness.

6. The insulated electric wire according to claim 1, wherein a melting point of the thermoplastic polyester elastomer is 200° C. or less.

7. The insulated electric wire according to claim 1, wherein a conductor cross-sectional area of the electric wire conductor is 3 mm$^2$ or more and 20 mm$^2$ or less.

8. A wire harness comprising the insulated electric wire according to claim 1.

9. The insulated electric wire according to claim 1, wherein the electric wire conductor is composed of a twisted wire formed by twisting together a plurality of element wires.

10. The insulated electric wire according to claim 9, wherein an outer diameter of each of the plurality of element wires is 0.45 mm or less.

11. The insulated electric wire according to claim 1, wherein a conductor cross-sectional area of the electric wire conductor is 8 mm$^2$ or more and 16 mm$^2$ or less.

12. The insulated electric wire according to claim 1, wherein an amount of the thermoplastic polyester elastomer contained in polymer components constituting the resin composition is 50% by mass or more.

13. The insulated electric wire according to claim 1, wherein an amount of the thermoplastic polyester elastomer contained in polymer components constituting the resin composition is 80% by mass or more.

14. The insulated electric wire according to claim 1, wherein the thermoplastic polyester elastomer includes a hard segment and a soft segment in a molecule structure,
the hard segment is composed of a polyester unit, and
the soft segment is composed of a polyether-based structure or a polyester-based structure.

15. The insulated electric wire according to claim 1, wherein a hardness of the thermoplastic polyester elastomer is 40 or less as defined by Shore D hardness.

16. The insulated electric wire according to claim 1, wherein a melting point of the thermoplastic polyester elastomer is 190° C. or less.

17. The insulated electric wire according to claim 1, wherein the resin composition further includes a thermoplastic elastomer different from the thermoplastic polyester elastomer and additives.

18. The insulated electric wire according to claim 17, wherein a content of the thermoplastic elastomer is 5 parts by mass or less with respect to 100 parts by mass of the thermoplastic polyester elastomer.

19. The insulated electric wire according to claim 17, wherein the thermoplastic elastomer is formed either one of maleic acid modified styrene-ethylene-butylene-styrene block copolymer (SEBS) or amine modified styrene-ethylene-butylene-styrene block copolymer (SEBS).

20. The insulated electric wire according to claim 17, wherein the additives are formed either one of carbodiimide group-containing compound, calcium carbonate, talc, clay, or silica.

* * * * *